US005926387A

United States Patent [19]

Furst

[11] Patent Number: 5,926,387

[45] Date of Patent: Jul. 20, 1999

[54] ULTRACENTRIFUGE OPERATION BY COMPUTER SYSTEM

[75] Inventor: Allen Furst, Half Moon Bay, Calif.

[73] Assignee: Beckman Instruments, Inc., Fullerton, Calif.

[21] Appl. No.: 08/664,156

[22] Filed: Jun. 14, 1996

Related U.S. Application Data

[60] Provisional application No. 60/000,612, Jun. 30, 1995.

[51] Int. Cl.[6] ........ G05B 9/02

[52] U.S. Cl. ........ 364/188; 364/413.07; 395/127; 395/500; 318/3

[58] Field of Search ........ 364/188, 413.07; 318/3, 801, 449; 422/64, 67, 56; 424/189.1; 395/127, 500; 494/37; 210/695, 782; 233/11; 356/23

[56] References Cited

U.S. PATENT DOCUMENTS

| | | | |
|---|---|---|---|
| 3,436,637 | 4/1969 | Ehret | 318/449 |
| 3,817,425 | 6/1974 | Liston | 222/1 |
| 4,054,243 | 10/1977 | Volkov et al. | 233/11 |
| 4,286,203 | 8/1981 | Ehret | 318/801 |
| 4,689,202 | 8/1987 | Khoja et al. | 439/725 |
| 4,740,077 | 4/1988 | Goodwill | 356/23 |
| 4,774,055 | 9/1988 | Wakatake et al. | 422/64 |
| 4,804,355 | 2/1989 | Brimhall et al. | 494/20 |
| 4,827,197 | 5/1989 | Giebeler | 318/3 |
| 4,950,608 | 8/1990 | Kishimoto | 422/102 |
| 5,104,621 | 4/1992 | Pfost | 422/67 |
| 5,158,769 | 10/1992 | Neurath | 424/189.1 |
| 5,171,206 | 12/1992 | Marque | 494/37 |
| 5,247,651 | 9/1993 | Clarisse | 395/500 |
| 5,260,872 | 11/1993 | Copeland et al. | 364/413.07 |
| 5,268,998 | 12/1993 | Simpson | 395/127 |
| 5,370,599 | 12/1994 | Marque et al. | 494/37 |
| 5,443,791 | 8/1995 | Cathcart et al. | 422/56 |
| 5,565,105 | 10/1996 | Thakor | 210/695 |
| 5,603,845 | 2/1997 | Holm | 210/782 |

OTHER PUBLICATIONS

Pengelly et al., "A Computer–Based Multipoint Vibration System for Process Plant Rotating Equipment", IEEE, pp. 1062–1073, Nov. 1988.

Simulation For Spin Coating Of Ferrofluid, IEEE, pp. 3129–3131, Nov. 1988.

*Primary Examiner*—William Grant
*Assistant Examiner*—McDieunel Marc
*Attorney, Agent, or Firm*—William H. May; P. R. Harder; Thomas Schneck

[57] ABSTRACT

A system and method of operating a centrifuge is disclosed. The operational parameters of the centrifuge are determined on the basis of the experimental protocol selected by the user. Parameters relevant to the particular experimental protocol are supplied by the user, while the run-time operating parameters of the centrifuge are automatically computed by the system. The centrifugal protocols contemplated in the present invention include pelleting, rate-zonal and isopycnic experiments. Depending upon the specific experimental protocol, the user must provide certain minimum information such as sedimentation rate and gradient concentrations used in the experiment. The user also must identify the rotor to be used, unless the centrifuge device is capable of identifying the rotor automatically. For unusual situations, the user may set the specific operating parameters of a centrifugal run in order to provide for customized experiments.

18 Claims, 12 Drawing Sheets

ULTRACENTRIFUGE OPERATION BY COMPUTER SYSTEM

CROSS REFERENCE TO RELATED APPLICATION

This application claims the benefit of U.S. Provisional Application No. 60/000,612, filed Jun. 30, 1995.

TECHNICAL FIELD

The present invention relates generally to centrifuges, and more particularly to a system and method for operating centrifuges.

BACKGROUND ART

In the biological and chemical sciences, there is often a need to separate particulate matter suspended in a solution. In a biological experiment, for example, the particles typically are cells, subcellular organelles and macromolecules, such as DNA fragments. A centrifuge is routinely used to perform the separation of such components from a solution.

The types of experiments that can be performed with a centrifuge are based primarily on three major sedimentation (fractionation) protocols, namely differential pelleting (differential centrifugation), rate-zonal density-gradient sedimentation and isopycnic density-gradient sedimentation. Basically, a centrifuge creates a centrifugal force field by spinning one or more tubes containing the solution to be separated, thus causing the suspended particles of interest to separate from the solution. The sedimentation rate of a particle is a function of such factors as the molecular weight and density of the particle, the centrifugal field acting upon the particle, and the viscosity and density of the solution in which the particle is suspended.

A differential pelleting experiment is primarily used for the sedimentation of particles according to size. The material to be fractionated is initially distributed uniformly throughout the sample solution. In a differential pelleting protocol, a centrifuge tube filled with the solution is spun to produce a centrifugal field which acts on the particles in the sample solution. Eventually, a pellet is formed at the bottom of the tube which is composed primarily of the larger particles present in the solution, but also includes a mixture of other smaller particles suspended in the solution.

A rate-zonal separation protocol is used to improve the efficiency of the fractionation by separating the particles according to size. Rate-zonal sedimentation of particles relies on the property that particles of different sizes (and therefore different masses) will migrate through a density-gradient at different rates when subjected to a centrifugal force field.

The technique involves layering a sample containing the components of interest onto the top of a liquid column which is stabilized by a density-gradient of an inert solute, typically sucrose. The maximum density of the gradient typically is less than the buoyant density of the components of interest, to allow migration of the components along the gradient. Upon centrifugation, the particles are driven down the gradient at a rate dependent upon factors including the mass and density of each particle, the density of the gradient, and the centrifugal forces acting upon each particle. Generally, the more massive particles will migrate at a faster rate than the lighter particles. With the passage of time, numerous "zones" or "bands" of particles having similar mass will form. As the centrifugation continues, the widths of the zones measured along the central axis of the centrifuge tube increase as well as the separation between bands. In addition, the zones themselves migrate toward the bottom of the tube, and eventually will coalesce at the bottom.

The third type of fractionation is an isopycnic density-gradient protocol, which relies on differences in the buoyant properties of the constituent particles dispersed in a high density solution as the basis for separation of the constituents. While centrifugation must proceed for a period of time sufficient to allow for banding, the protocol is an equilibrium technique in which separation essentially is independent of the time of centrifugation and of the size and shape of the constituents, although these parameters do determine the rate at which equilibrium is reached and the width of the zones formed at equilibrium.

There are two ways to prepare a solution for an isopycnic separation experiment. A solute having a pre-formed high density-gradient is provided, in which a sample containing the macromolecules is included. Subsequent centrifugation of the preparation will cause the macromolecules of the sample to migrate through the high density solute, forming bands at positions along the density-gradient corresponding to the buoyant density of each macromolecule. At each of these equilibrium positions, the buoyant force of the solute acting on a macromolecule is canceled by the opposing forces of the centrifugal field. Alternatively, the solution to be centrifuged may be prepared by mixing a solution of the macromolecules or particles of interest with a high density solute to give a uniform solution of both. In this case, the density-gradient forms during the centrifugation, with the particles forming bands along the resulting gradient as described.

Present centrifuge systems provide users with an interface for selecting the speed and duration of a centrifuge run. Additional parameters may be set, including a temperature setting for the run and the particular rotor to be used. Typically, a user will set up a centrifuge run first by deciding which of the three types of centrifuge protocols or experiments is appropriate for a given circumstance. Next, the user must determine the centrifugation speed and the run-time for the particular experiment and then set the centrifuge accordingly. Computing the run-speed and the run-time for an experiment depends upon a number of factors, such as the selected centrifuge protocol, the sedimentation rate of the particles of interest and knowledge of the parameters of the rotor to be used. In the case of density-gradient separations, namely the rate-zonal and isopycnic protocols, the gradient of the solute must be included in the computations as well.

A centrifuge is just one of a number of tools which the experimenter uses in solving the problem at hand, and so should be easy to use. Computing the operational run parameters for a centrifuge run and adjusting the centrifuge for the actual experiment generally do not relate to the problem being addressed. The experimenter thus is burdened with unnecessary detail, which tends to be distracting and therefore inefficient.

What is needed is a system and method which eliminate the extraneous steps of setting up a centrifuge for an experiment and which simplify setting up the centrifuge. The system and method, however, should also allow a user to directly manipulate the operational parameters of the centrifuge when unusual circumstances present themselves, requiring complete control over the centrifuge.

SUMMARY OF THE INVENTION

In an embodiment of the present invention, the system and method for operating a centrifuge include querying the user of the centrifuge for information relating to the desired centrifugation experiment or protocol. A set of first selections is presented to the user, identifying the available centrifuge experiments. Based on the user's selection, a set of second selections is presented to the user relating to the hardware to be used. This includes providing a list of available rotors, and whether adapters are to be used with a particular rotor. Next, the user is presented with a query regarding the parameters of the particles of interest, such as the sedimentation rate(s) of the particles. Using the information provided by the user, the system attends to the details of performing the run, including computing the operational parameters of the centrifuge for the specified run and operating the centrifuge to perform the selected experiment.

BEST MODE FOR CARRYING OUT THE INVENTION

Figure 1A:
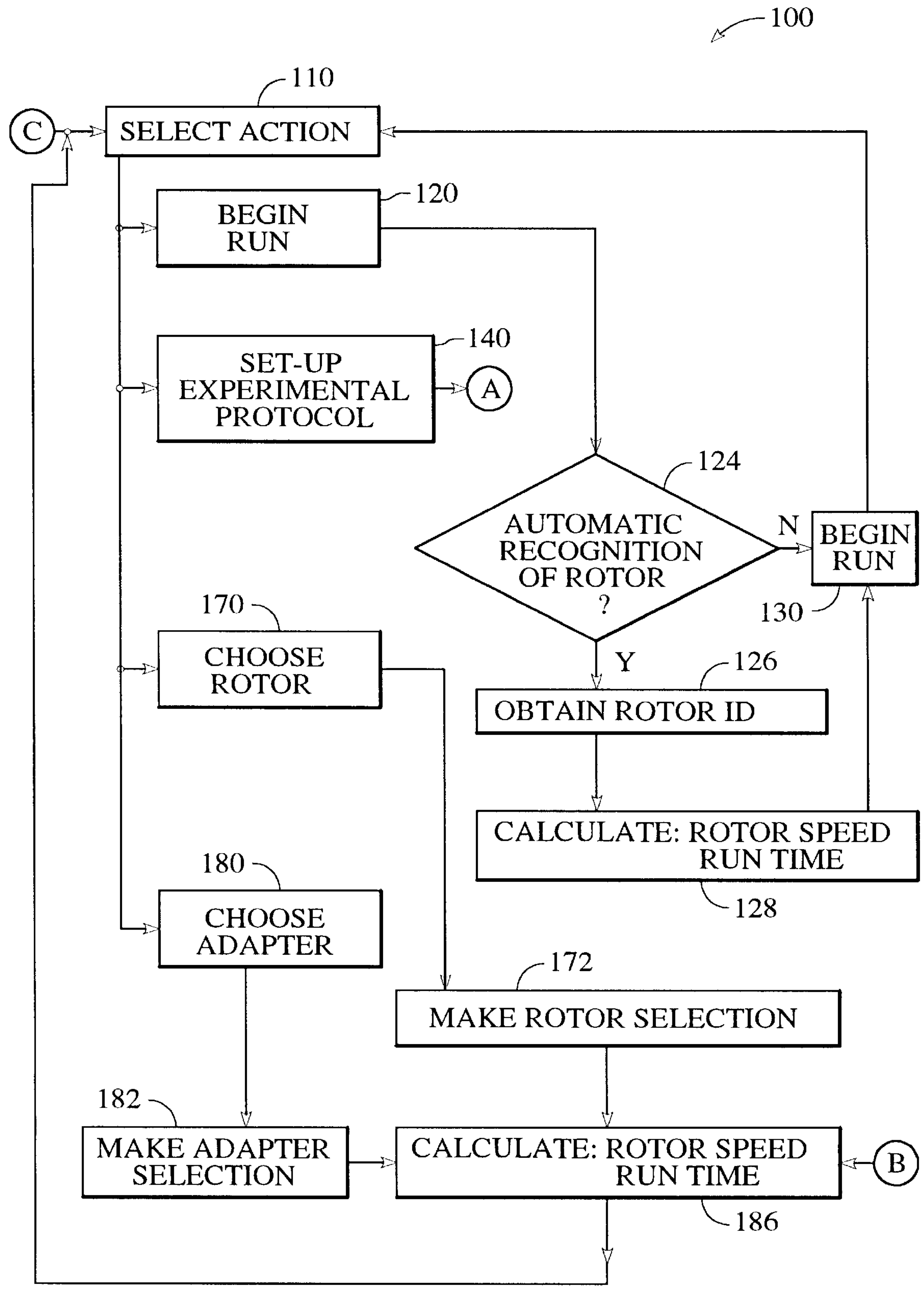
FIGS. 1A and 1B are portions of the flowchart outlining the steps for operating a centrifuge in accordance with the present invention.

The present invention is further described with reference to the drawings and the following discussion of the best mode contemplated for practicing the invention. The same reference numerals are used to identify like elements appearing in the various figures of the drawings. A description of the basic steps of the present invention first will be presented. The discussion then will focus on a specific implementation of a user interface for operating a centrifuge according to the invention.

Figure 1B:
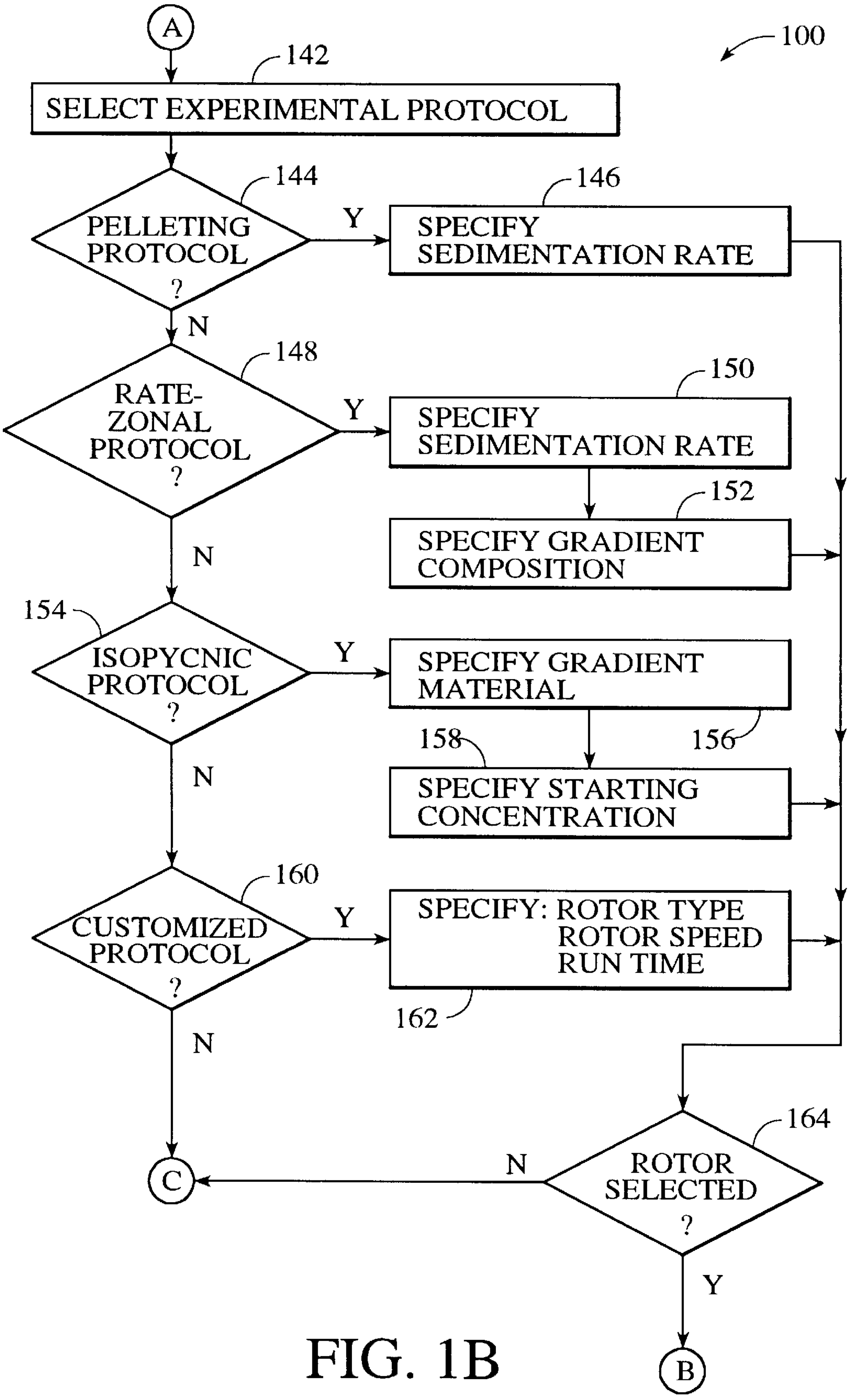

Reference is made to the flowchart 100 shown in FIGS. 1A and 1B, illustrating the basic steps for operating a centrifuge (not shown) in accordance with the present invention. The flowchart serves merely to outline the features of the invention and does not represent an actual sequence of operations to be performed by an operator.

An operator of the centrifuge, who has in mind a particular centrifugation experiment, will specify the experiment to be run, describing the parameters of the solution to be centrifuged. The operator will also specify a particular rotor to be used or, if the centrifuge device has the capability, let the centrifuge automatically identify the rotor being used. optionally, an adapter may be chosen for use with the rotor.

Turning to the portion of the flowchart 100 shown in FIG. 1A, any one of a number of actions may be selected at step 110, namely beginning a centrifuge run 120; setting up an experimental protocol 140; choosing a rotor 170; and choosing an adapter 180. Each of these actions is described in greater detail in the following discussion:

A discussion of the step of beginning a centrifugation run 120 will be delayed, until after a description of the underlying elements of the present invention first is presented. Turn now to the step of setting up an experimental protocol 140, which is shown in detail in the portion of the flowchart 100 shown in FIG. 1B. The user first selects one of a number of experimental protocols to be set-up 142. They include: a pelleting protocol 144; a rate-zonal protocol 148; and an isopycnic protocol 154. In addition, a customized protocol 160 may be defined by the user.

In a pelleting protocol 144, the particles of interest are separated from solution by spinning a centrifuge tube containing the solution at a certain rotational speed for a period of time. The user must specify the sedimentation coefficient 146 of the particles to be separated.

In a rate-zonal protocol 148, a solution of the macromolecules is layered on a liquid column having a known density gradient. Subsequent centrifugation of the preparation will cause the macromolecules to migrate down the length of the centrifuge tube under the influence of the centrifugal force field, the rate of migration varying with the mass of each particle. Thus, a rate-zonal experiment requires the user to specify the sedimentation coefficient 150 and the gradient composition of the liquid column 152.

In an isopycnic protocol 154, the particles are separated out based upon their buoyant densities. Under the influence of a centrifugal field, the solution in which the particles are dissolved forms a density-gradient. Each particle migrates to higher or lower regions of the density gradient until the buoyant forces of the gradient acting on the particle are canceled by the counteracting forces of the centrifugal field. The mass of the particles is not a factor in an isopycnic protocol if the centrifugation is run to equilibrium, so that the user need only specify the gradient material being used 156 and the starting concentration 158. A method for determining when equilibrium has been reached is disclosed in U.S. Pat. No. 5,370,599 to Marque et al., entitled "Terminating Centrifugation on the Basis of the Mathematically Simulated Motions of Solute Band-Edges," and is incorporated herein by reference. Alternatively, it is possible to run an isopycnic centrifugation for a shorter period of time than would be normally required to reach equilibrium. Such a technique is described in U.S. Pat. No. 5,171,206 to Marque, entitled "Optimal Centrifugal Separation," and is incorporated herein by reference. Both of the above-described patents have been assigned to the assignee of the present invention.

In addition to the three standard centrifugation protocols, the user may define a customized configuration for a centrifugation run 160 when the circumstances call for a specialized experiment. This allows the user to specify the rotor type, rotor speed and run time 162.

Having set-up the parameters for a centrifugation experiment, a decision is made by the system whether to calculate the rotor speed and the run time for the experiment. The computation is automatically performed if a rotor has been previously selected, step 164. If the computation is to be made, the flow of control from step 164 leads to the computation step by following the continuation connector B in FIG. 1B to step 186 shown in FIG. 1A. If no computation is to be made, then the flow of control from step 164 returns to step 110 of FIG. 1A, as shown by the continuation connector C.

Returning to the portion of the flowchart 100 shown in FIG. 1A, another action which the user may select in step 110 is choosing a rotor, steps 170 and 172. After selecting a rotor, the rotor speed and the run time will be computed 186 for the experimental protocol that has been set up by the user.

The user may also select a particular adapter to be used with a given rotor, steps 180 and 182. An adapter allows for the use of centrifuge tubes smaller than the tube cavities of a rotor. There are two kinds of adapters: the first kind is one which is placed at the bottom of the cavity so that the centrifuge tube rests on top of the adapter; the second kind is one in which the adapter rests on top of the centrifuge tube. Since the radial position of the tube varies with the kind of adapter used, the rotor speed and run time computations 186 must include the radial position information of the adapter, if one is subsequently selected.

The step of beginning a centrifugation run 120 may be viewed as the user having pressed a "start" button on the centrifuge device to begin the run. If the centrifuge device is capable of automatically identifying the rotor being used 124, the rotor type of the actual rotor mounted in the centrifuge is determined by the centrifuge. The rotor speed and the run time for the selected experiment are then automatically computed, step 128, taking into account whether an adapter has been selected as in step 186. If there is no automatic rotor identification capability, then the rotor speed and run time calculations previously automatically computed will be used. Finally, the centrifuge run is initiated step 130 and controlled according to the automatically computed operating parameters.

This concludes the description of the basic steps of operating a centrifuge in accordance with the invention as outlined in the flowchart. The discussion now will focus on a graphical user interface contemplated as the best mode for practicing the present invention, incorporating the above-described features and introducing additional details not described in the flowchart. References to the steps in the flowchart 100 are provided parenthetically to aid in the discussion.

The user interfaces shown in FIGS. 2–6 may be implemented in any of a number of window-based computing environments, such as the APPLE MACINTOSH line of computers, MICROSOFT WINDOWS applications, and X-Windows applications. "APPLE," "MACINTOSH," and "MICROSOFT WINDOWS" are federally registered trademarks. The computing environment includes a computer, a display unit, and one or more input devices. The display unit may have its own input device, as in the case of a touch sensitive screen.

Figure 2A:
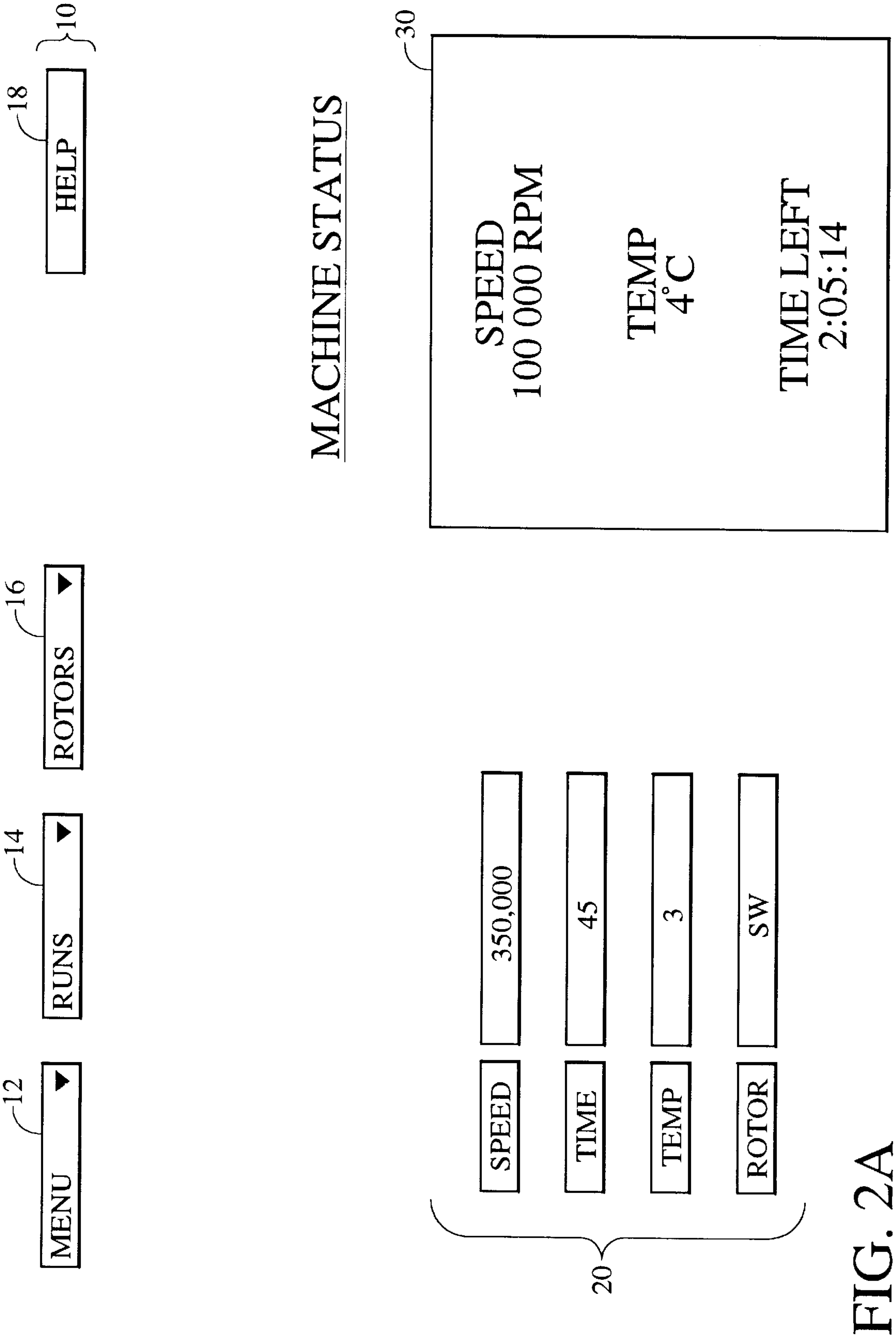
FIGS. 2A–2D show the main screen and the menu options for a user interface of the present invention.

Turning to FIGS. 2A–2D, the main, or top-level, screen of a user interface is shown, depicting the various options available to the user. As shown in FIG. 2A, the main screen includes a menu bar 10 having four pull-down menus: MENU 12, RUNS 14, ROTORS 16 and HELP 18. A menu item may be selected (steps 120, 140, 170) by an input device such as a mouse or by selecting a pre-defined key from a keyboard. The menus will be described below. The HELP menu 18 provides helpful information, explaining to the user the features of the system and providing assistance in the use of the system. Various methods of implementing a help menu are known in the art of user interface design and so need no further elaboration.

A current operational settings area 20 indicates the speed, time, temperature and rotor settings for the centrifuge. The operational settings area reflects the settings that correspond to the selected experimental protocol. A machine status window 30 indicates the actual operating status of the machine and is updated in real time to reflect the current operating status of the centrifuge at any given moment in time. The information in both the settings area 20 and the status window 30 is read-only and cannot be altered by the user. The information is derived from the experimental protocol defined by the user, as will be discussed below.

Figure 2B:
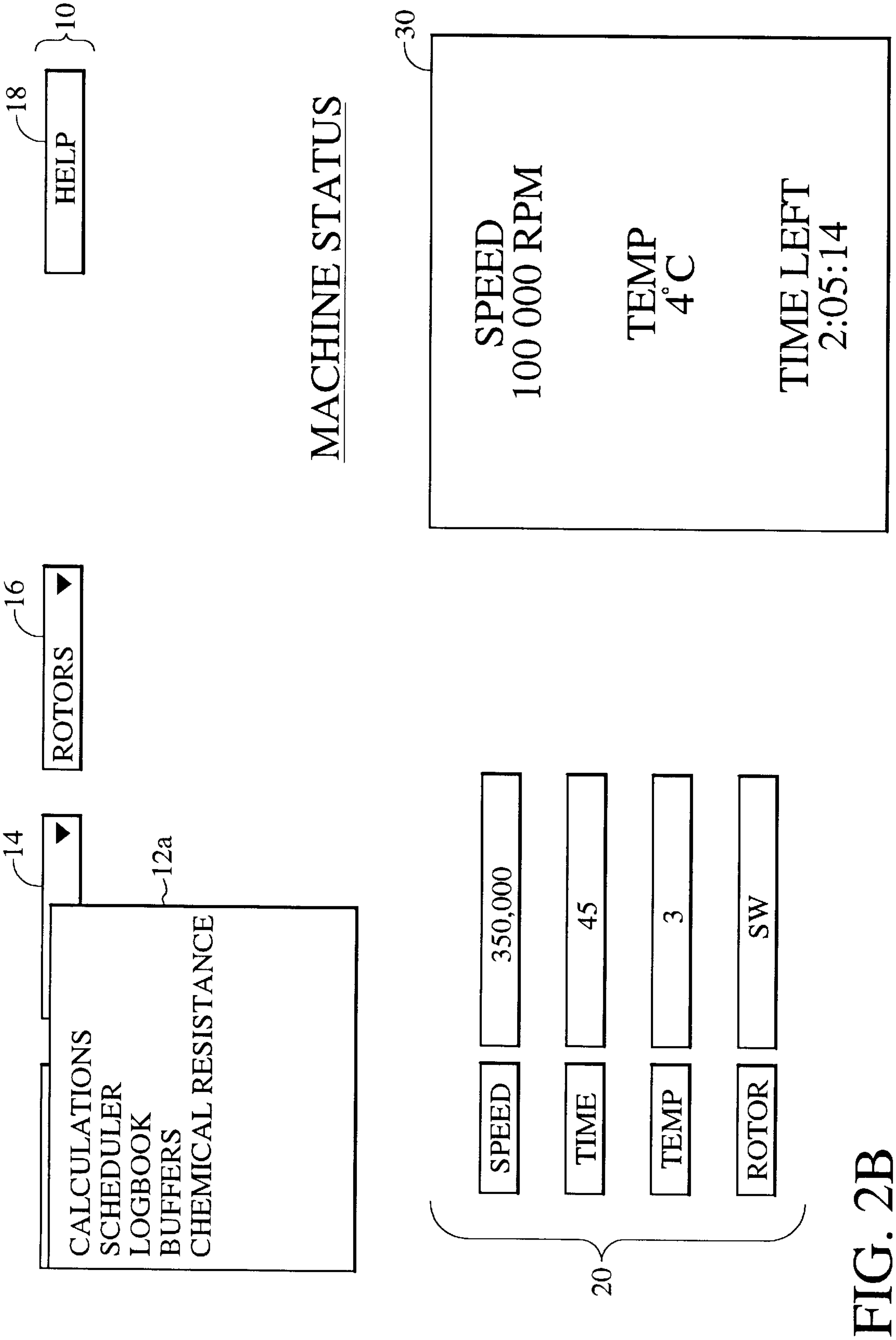

The main screen shown in FIG. 2B illustrates the menu choices 12A available to the user when the MENU menu has been selected. A menu choice may be selected as described above, for example, by moving a mouse to position a cursor (not shown) at the desired choice or by selecting a pre-defined key on the keyboard.

Figure 2C:
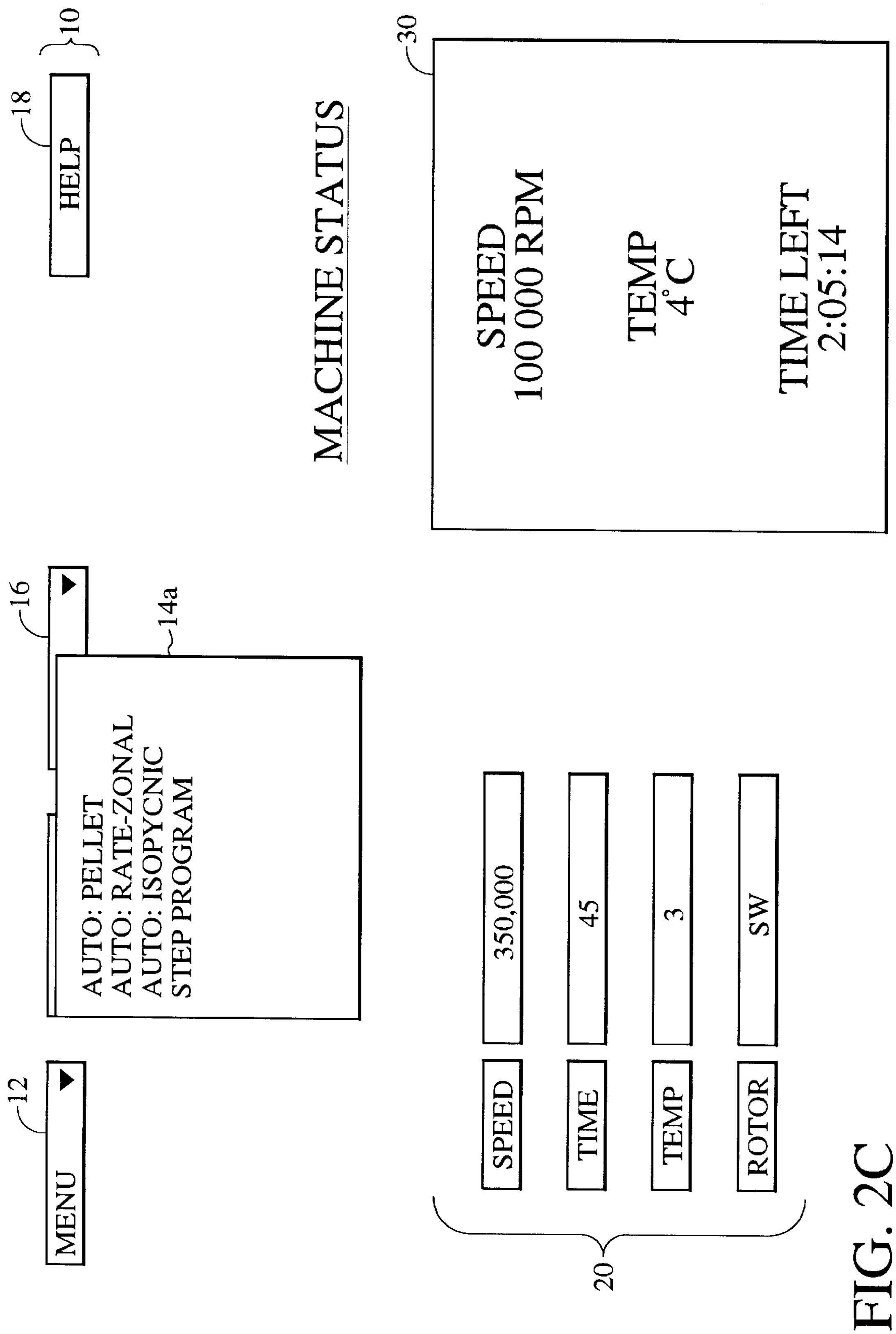

The main screen shown in FIG. 2C illustrates the means by which the user sets up a particular centrifugation experiment. The figure shows the menu choices 14A for the RUNS menu, listing the experimental protocols available to the user (steps 142–158). The choices include pellet, rate-zonal and isopycnic protocols. Each choice leads to a screen which enables the user to set up the selected protocol. The menu choices 14A also include a step program which activates a screen to allow the user to set up a customized experiment (steps 160, 162). The corresponding screens for these experiments will be discussed below.

Figure 2D:
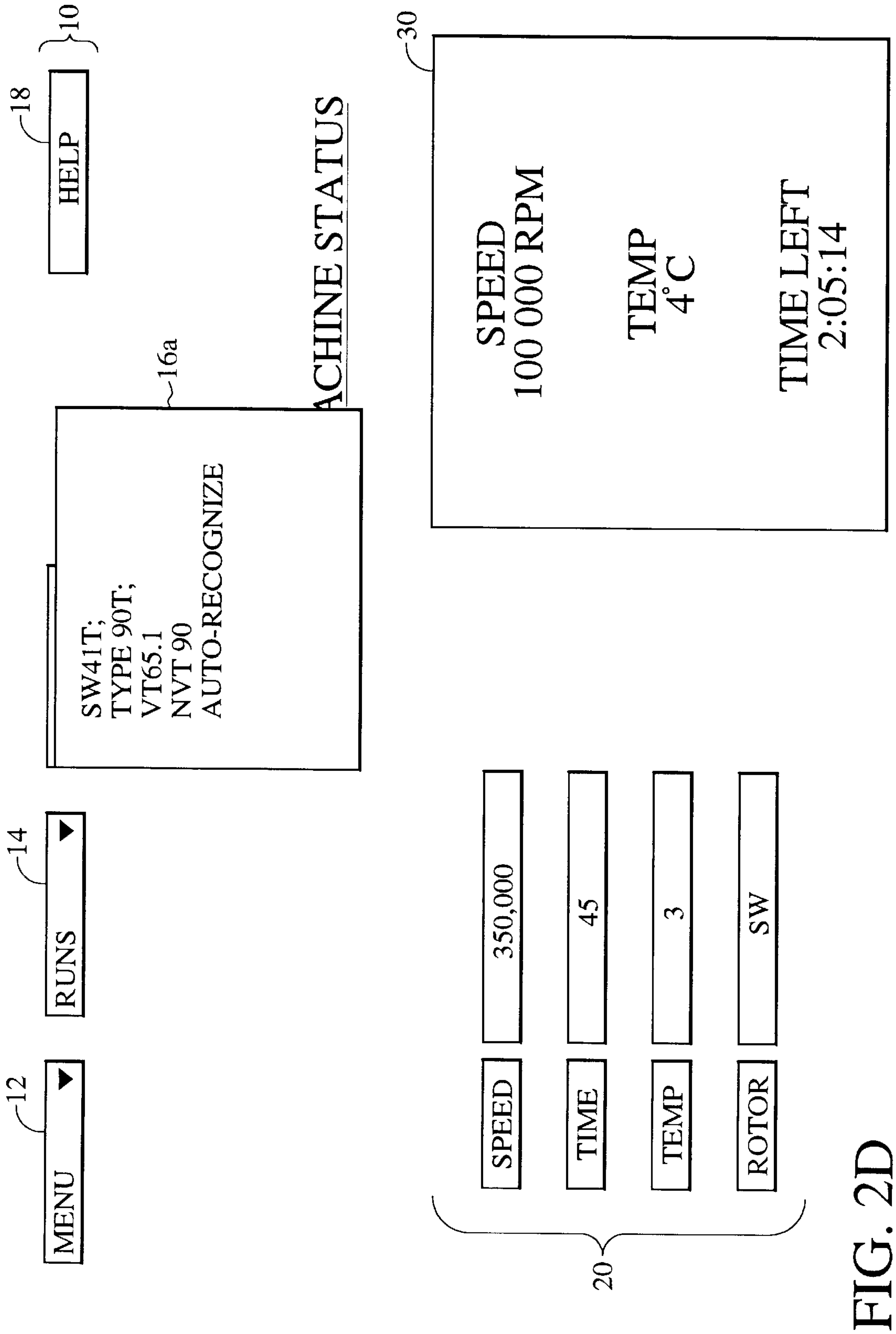

The ROTORS menu choices 16A in FIG. 2D allow the user to select from among a number of rotor types (steps 170, 172). Included among the menu choices is a choice called AUTO-RECOGNIZE. If AUTO-RECOGNIZE is selected, identification of the rotor type is delayed until the actual experiment is performed, at which time the centrifuge device will automatically identify the rotor (steps 124, 126).

Figure 3A:
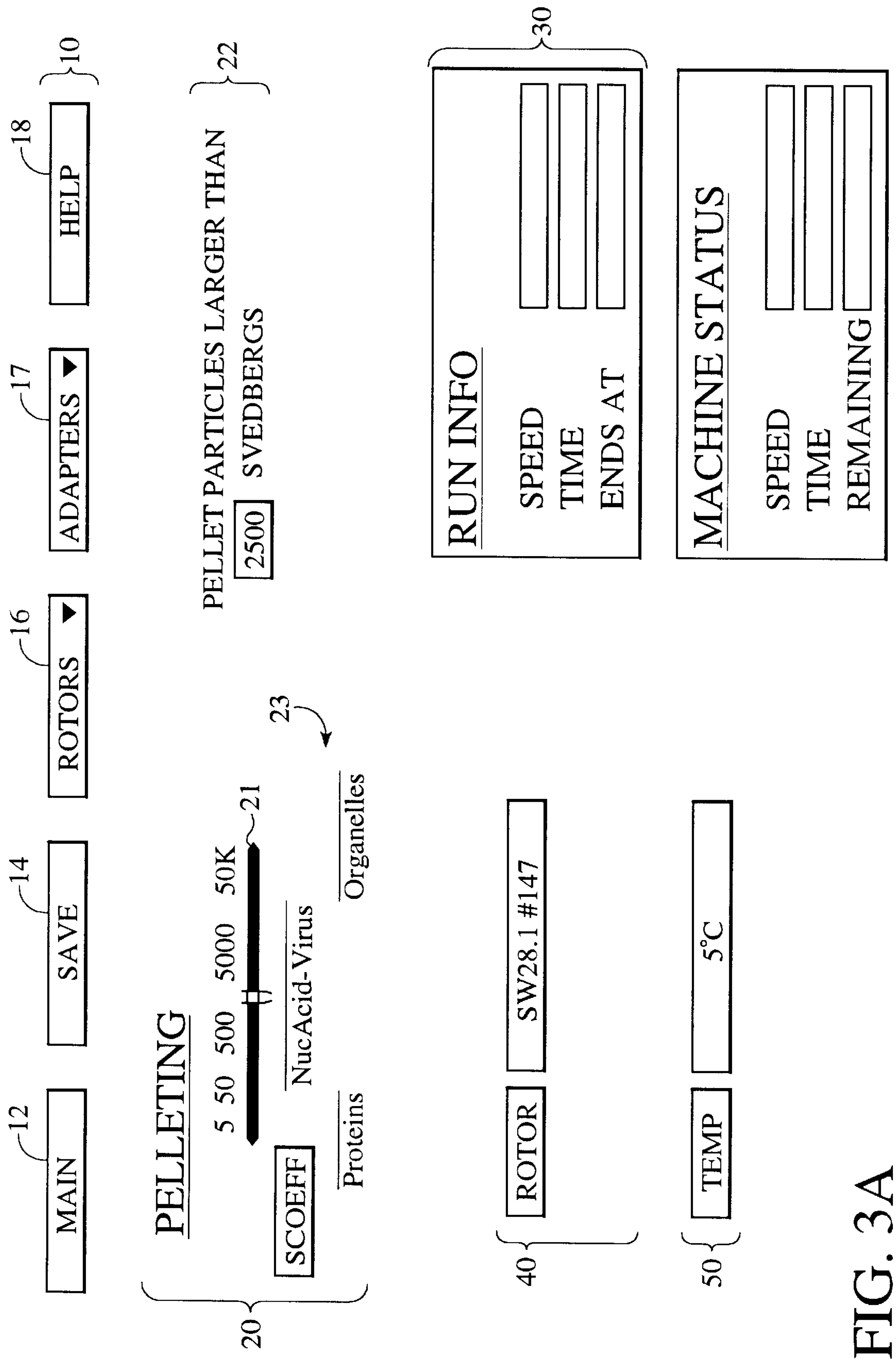
FIGS. 3A–3B illustrate a pelleting protocol screen.

The discussion will now turn to the screens for setting up each of the centrifugation protocols as contemplated in the present invention. Referring to FIG. 3A, a set-up screen for a pelleting experiment is shown. Recall that this screen is presented to the user when the corresponding menu choice in the RUNS menu 14A of the main screen (FIG. 2C) is selected. The menu bar 10 of the pelleting screen shown in FIG. 3A includes: MAIN menu 12, SAVE menu 14, ROTORS menu 16, ADAPTERS menu 17 and HELP menu 18. The MAIN menu 12 will bring the user back to the main screen (FIG. 2A). The SAVE menu 14 allows the user to save the selected settings of the pelleting experiment to be run at a later time. The HELP menu 18 provides help information relevant to the features of a pelleting protocol.

Figure 3B:
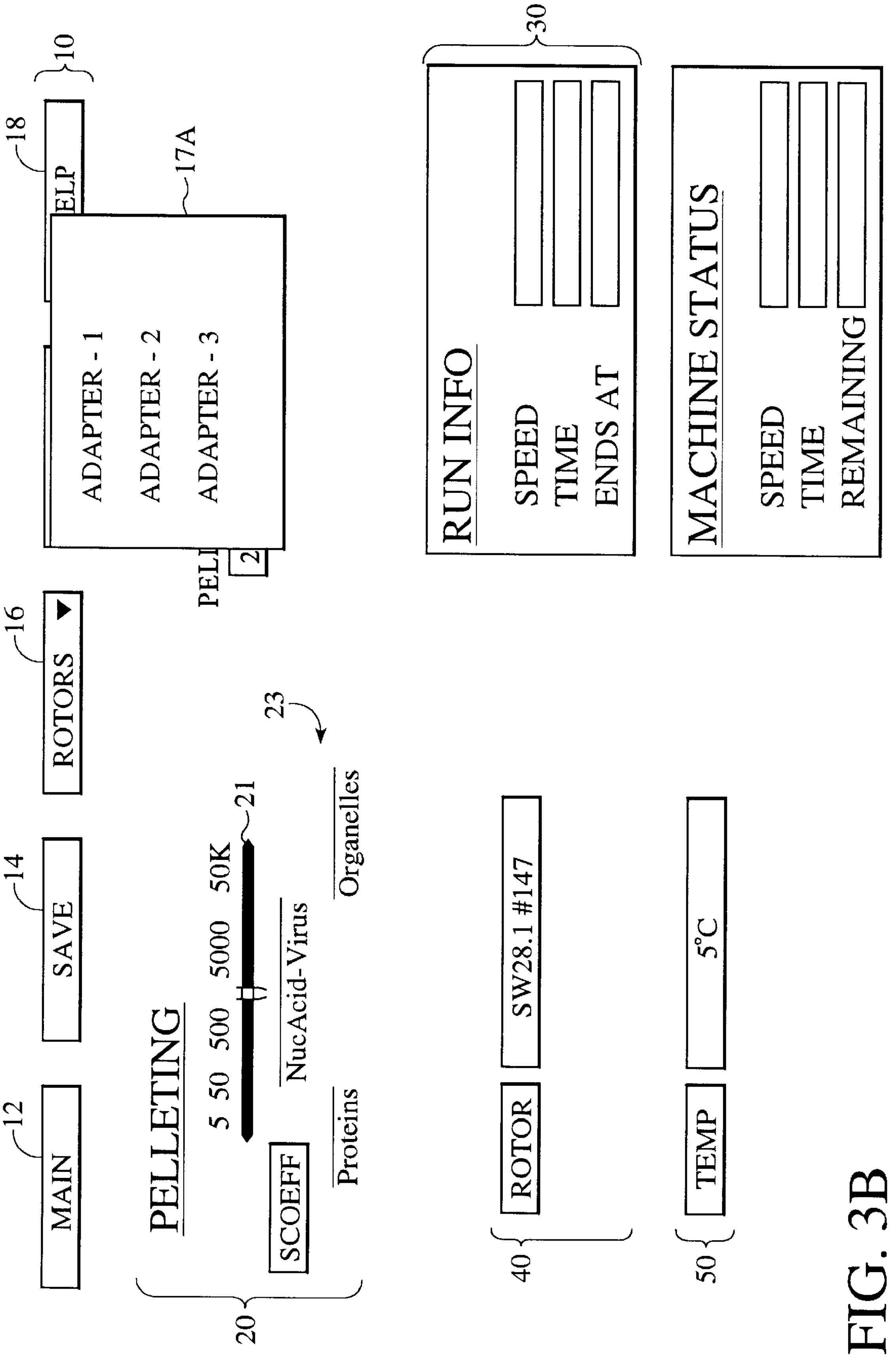
Figure 4A:
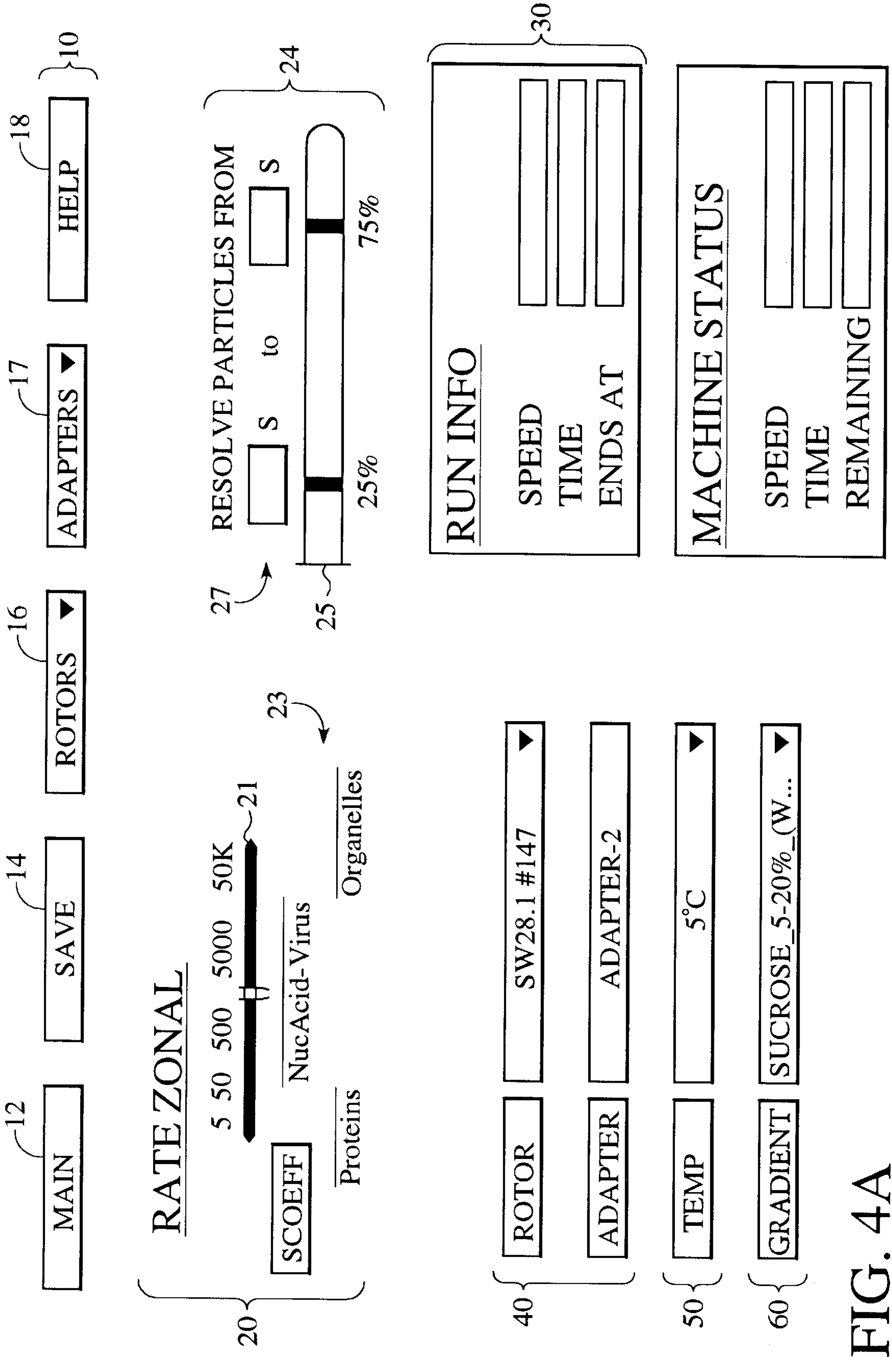
FIGS. 4A–4B depict a rate-zonal protocol screen.

When the user selects a rotor from the list of rotors provided by the ROTORS menu 16, the rotor type is displayed in a rotor area 40 on the screen. In FIGS. 3A and 3B, for example, the selected rotor is "SW28.1 #147." The rotor area 40 would be blank if a rotor had not been selected for the experiment. Selection of a rotor also causes the ADAPTERS menu 17 to be displayed. This menu allows the user to choose an adapter, if one is desired, for a particular experiment (steps 180, 182). FIG. 3B shows the choices in the ADAPTERS menu 17A. Selecting an adapter for the chosen rotor causes the selected adapter to be displayed in the rotor area 40. Thus, for example, the rotor area 40 in the screen shown in FIGS. 3A and 3B indicates that an adapter has not been chosen; however, FIG. 4A shows that "Adapter-2" has been chosen to be used with the selected rotor "SW28.1 #147."

Returning to FIG. 3A, the pelleting set-up screen includes a sedimentation coefficient selector 20, having a slide element 21 on which a range of coefficient values (in Svedbergs) is displayed on a logarithmic scale. Graphics 23 below the slide element 21 correlate the coefficients to a variety of typical samples for separation. For example, proteins occupy the low end of the scale, with sedimentation coefficients typically on the order of 5–50 Svedbergs. At the other end of the scale, are cellular structures known as organelles which have sedimentation coefficients in the range of 5000–50,000 Svedbergs.

In an embodiment of the invention, it is contemplated that a touch sensitive screen will be used so that the selector 20 responds to touch, allowing the user to select the sedimentation coefficient simply by touching the slider element 21 with a finger and sliding the finger along the screen. A coefficient window 22 reports the actual value of the selected coefficient, as the slide element 21 is adjusted by the user.

A run information window 30 displays the computed rotor speed and run time for the pelleting experiment based upon the user's selection of the sedimentation coefficient and the rotor (step 186). The speed and time calculations are made at the maximum permitted speed for the selected (or subsequently identified) rotor. This window is a read-only window which is automatically updated in real-time as the settings for the experiment are changed, namely the sedimentation coefficient and the rotor with an optional adapter. If a rotor has not been selected, the computations are delayed until a selection is made or until an actual centrifugal run is begun, at which time the rotor must be made known to the system (step 126). The required computations for determining the run-time of a pelleting experiment are known in the centrifugation arts and are readily understood by a person of ordinary skill wishing to practice the present invention.

Turn now to FIG. 4A which shows a screen for setting up a rate-zonal experiment. The menu bar 10 includes the same menus as those described for the pelleting screen (FIGS. 3A and 3B). The rotor area 40 provides the same information as for the pelleting screen. The sedimentation coefficient selector 20, likewise, operates in the same manner as described above with respect to the pelleting screen; the coefficient is selected simply by sliding the slide element 21.

A temperature selector 50 allows the user to specify the temperature of the centrifuge chamber. This selector displays a pop-up menu 50A (FIG. 4B), providing a list of temperature selections from which a temperature setting may be selected. The selector 50 appears in the pelleting and isopycnic screens (FIGS. 3A and 5) as well and operates in the same fashion.

Specific to the gradient-density protocols, namely rate-zonal and isopycnic, is a gradient composition selector 60. This selector is a pop-up menu, similar to the pop-up menu 50A of the temperature selector 50, providing a list of gradient compositions which the user may select for the experiment. Although not shown in the drawings, typical gradient compositions include various concentrations of sucrose solutions, NYCODENZ solution, CsCl and $Cs_2SO_4$. NYCODENZ is a federally registered trademark.

Figure 4B:
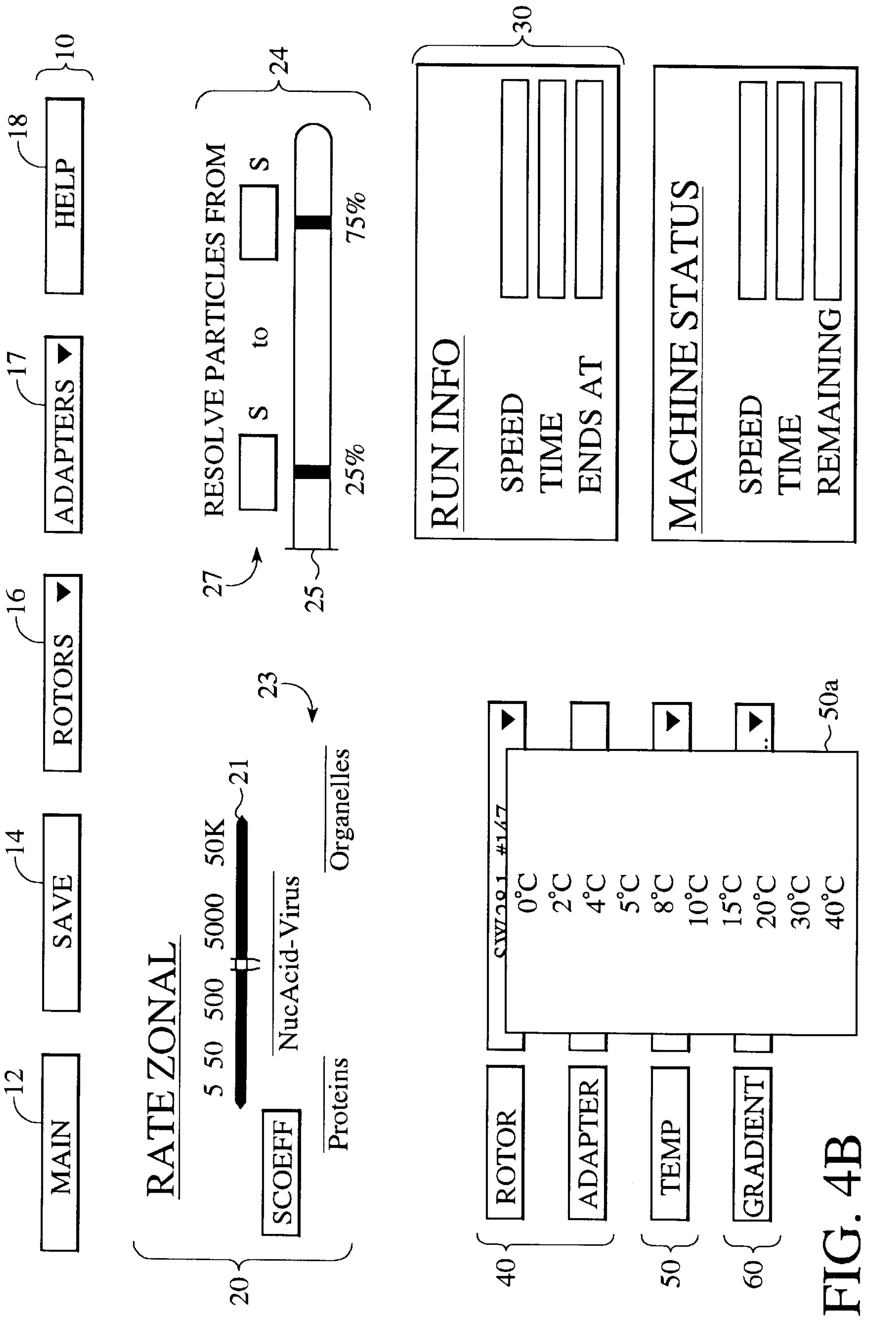

Unique to the rate-zonal set-up screens depicted in FIGS. 4A and 4B is a zone indicator 24, composed of an iconic representation of a centrifuge tube 25 and a sedimentation coefficient range indicator 27. The graphic of the centrifuge tube 25 includes two marks 25% and 75%, marking positions along the length of the tube measured from the tube opening. The region between the two marks indicates to the user the sedimentation resolution that will be obtained when the particular rate-zonal experiment is run. The range indicator 27 reports to the user the sedimentation coefficient values of the particles expected to fall within the 25%–75% region, based upon the above-discussed selected parameters of the experiment. The 25% and 75% values are typical values, and may be changed by the user.

In accordance with the present invention, the range of the range indicator 27 is automatically computed and displayed when the user has specified a sufficient amount of information for the calculations to be made. Likewise, the run information window 30 automatically reports the maximum permitted rotor speed and the run time for the specified rate-zonal experiment when sufficient information becomes available for the computations. Thus, for example, if a rotor is not specified, the above computations are delayed until a rotor has been selected by the user, or automatically determined by the centrifuge device prior to the actual centrifugation run. The analytical methods for rate-zonal computations are known in the relevant arts, and so an artisan of ordinary skill would be able to practice the present invention.

Figure 5:
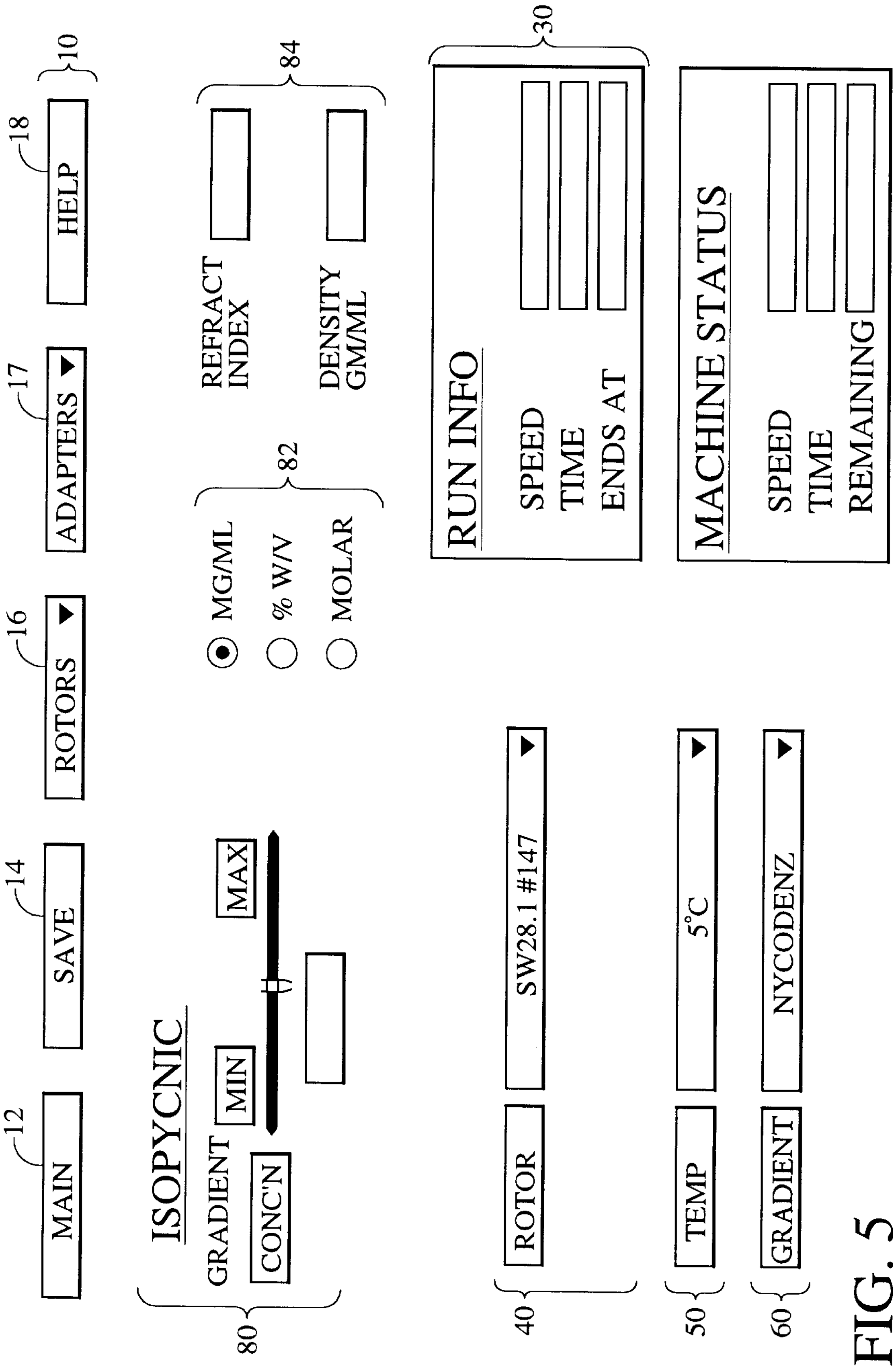
FIG. 5 shows an isopycnic protocol screen.

Turning now to FIG. 5, the screen for setting up an isopycnic experiment is shown. The menu bar 10, rotor area 40 and temperature selector 50 operate and provide the same functionality as described in the pelleting and rate-zonal set-up screens (FIGS. 3A–4B). The gradient composition selector 60 is a pop-up menu which allows the user to select from a number of available gradient materials in a manner similar to the pop-up menu of the gradient selector 60 (FIG. 4B) for the rate-zonal set-up screen.

The isopycnic set-up screen includes an initial gradient concentration selector 80, which allows the user to specify the starting concentration of the selected gradient composition. Three radio-buttons 82 offer a selection of alternate units of concentration, such as milligrams-per-milliliter, percent weight-per-unit volume, and molar concentrations. A region 84 reports the refractive index and density of the selected gradient material.

The run information window 30 responds to user selections and reports rotor speed and run-time information as described above for the pelleting and rate-zonal protocols. The analytical techniques for predicting run-times of isopycnic experiments are known in the relevant arts. Examples of such techniques are described in the referenced U.S. patents to Marque and to Marque et al., but are not limited thereto.

Figure 6:
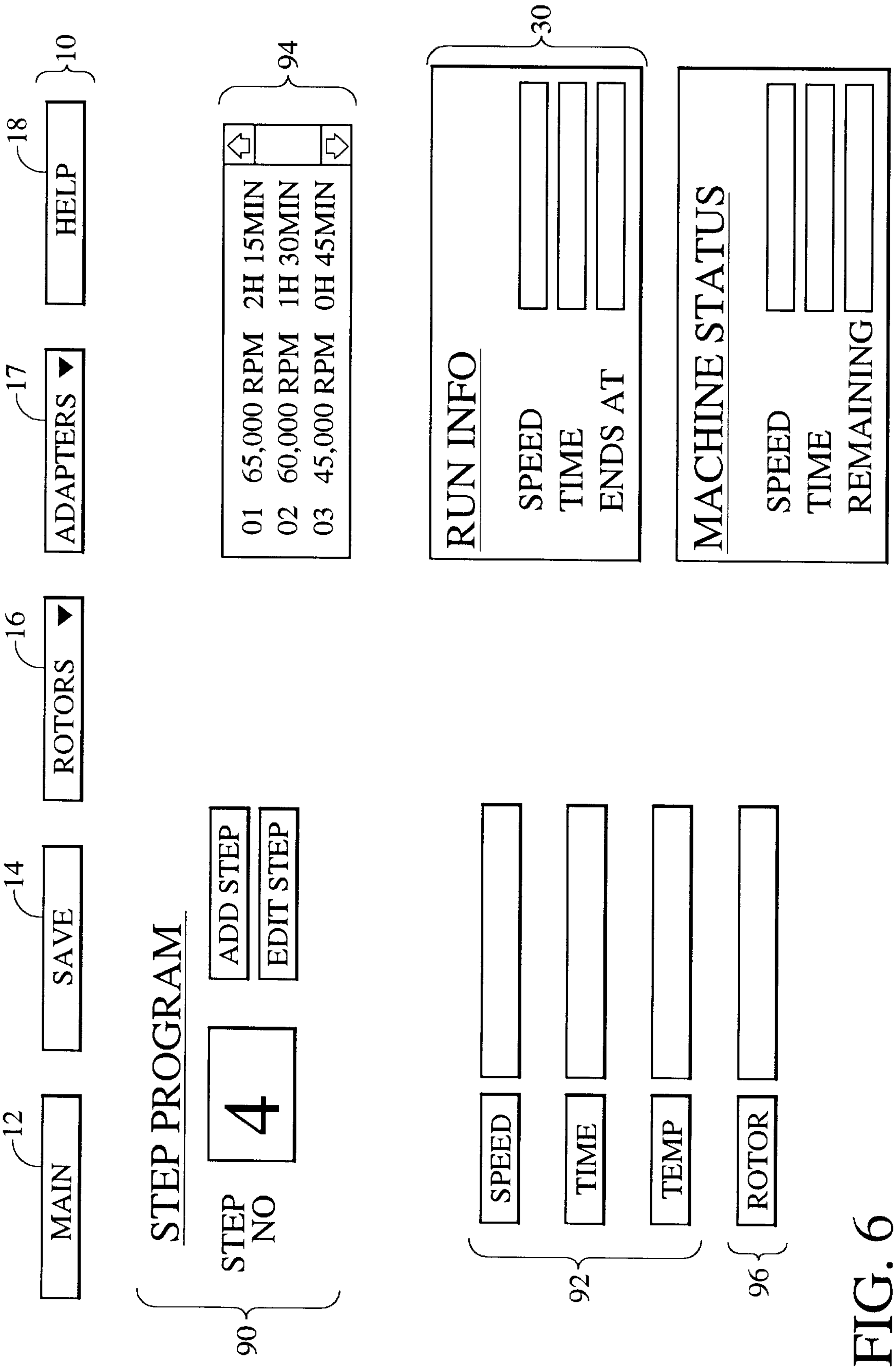
FIG. 6 illustrates a screen for setting up a customized centrifugation experiment.

The set-up screen shown in FIG. 6 is used when a situation calls for a customized experiment. The user can specify a centrifugation run by selecting a specific rotor speed and a duration for the run. More generally, the user may define a centrifugation run to consist of a program of two or more steps, where each step is defined by a rotor speed and run time. In this "step program," the centrifuge is operated at a speed and for a duration specified in a first step, after which the centrifuge is operated according the settings in a second step, and so on until all the steps in the step program have been performed.

A step selection area 90 allows the user to define, for each step, the speed and duration for that step. This information is entered in the appropriate entries in the step definition area 92. Note that the temperature for each step can be specified as well. The defined steps are displayed in the program window 94. The selected rotor is reported in the rotor area 96.

It is not intended that the present invention be limited to the foregoing discussion. It is understood that variations and modifications to the described embodiment would be readily apparent to a person of ordinary skill in the art. It is contemplated that such changes would not depart from the scope and spirit of the present invention, which is particularly described and distinctly claimed in the following claims.

I claim:

1. A method to control a centrifuge device for centrifugation of a sample, said method comprising the step of:

operating a computer system to display a set of centrifugation experiments capable of being performed by said centrifuge device and selecting a centrifugation experiment therefrom;

operating said computer system to display a plurality of hardware configurations for seating said sample to said centrifuge device and selecting a hardware configuration therefrom;

selecting physical parameters of said sample related to said selected centrifugation experiment;

computing usinq said computer system run parameters based on said selected centrifugation experiment, said selected hardware configuration and said specified physical parameters, said run parameters including a rotor speed and a run time; and operating said centrifuge device in accordance with said computed run parameters thereby performing said selected centrifugation experiment, including communicating said run parameters to said centrifuge device and displaying a current operating status of said centrifuge device.

2. The method of claim 1 wherein said step of having said computer system display a set of centrifugation experiments includes displaying a list designating pelleting, rate-zonal and isopycnic experimental protocols.

3. The method of claim 1 wherein said step of having said computer system display a plurality of hardware configurations includes displaying a list designating a plurality of rotors.

4. The method of claim 3 wherein said step of having a computer system display a plurality of hardware configurations further includes displaying a list designating a plurality of adapters.

5. The method of claim 1 wherein said computer system displays a current operating status of said centrifuge device which includes displaying a current rotating speed of a rotor spinning within said centrifuge device, measuring the elapsed time of said selected centrifugation experiment and displaying the remaining time thereof.

6. The method of claim 1 wherein said computer system includes a video display screen and each of said steps of displaying includes presenting information in the form of graphical menu items on said video display screen.

7. A method of obtaining information relating to centrifugation of a sample containing biochemical specimens and operating a centrifuge device in accordance with said information, said method comprising the steps of:

controlling a computer to display a list of centrifugation protocols, said list of centrifugation protocols including a step program protocol wherein centrifugation is carried out in one or more steps, each step specifying a step speed and a step duration;

choosing a centrifugation protocol from said list of centrifugation protocols;

if said chosen centrifugation protocol is other than a step program protocol, controlling said computer to display physical parameters of said sample which are related to said chosen centrifugation protocol, and specifying values for said physical parameters;

having said computer system display a list of rotor identifiers, said list of rotor identifiers including an identifier signifying automatic rotor detection by said centrifuge device;

choosing a rotor identifier from said list of rotor identifiers;

controlling said computer to display a selection of adapters and choosing an adapter therefrom;

if said chosen centrifugation protocol is other than a step program protocol, controlling said computer to compute a rotor speed and a run time based upon said chosen centrifugation protocol, said specified physical parameters, said chosen rotor identifier and said chosen adapter, said computing a rotor speed and a run time including detecting the presence of a rotor and determining the type of said detected rotor, if said chosen rotor identifier signifies automatic rotor detection; and transmitting a computed rotor speed and a computed run time to said centrifuge device and activating said centrifuge device to perform said chosen centrifugation protocol.

8. The method of claim 7 further including specifying a temperature setting for centrifugation of said sample, said step of controlling said computer to compute further being based upon said specified temperature setting.

9. The method of claim 7 further including using said computer system to specify a first step speed and a first step duration, if said step program protocol is chosen.

10. The method of claim 7 wherein said having a computer system display a list of centrifugation protocols includes listing pelleting, rate zonal and isopycnic protocols.

11. The method of claim 10 wherein said having a computer system display physical parameters includes displaying a plurality of ranges of sedimentation coefficients if a pelleting or rate zonal protocol is chosen, whereby the sedimentation coefficient of said biochemical specimen can be selected.

12. The method of claim 10 wherein said having a computer system display physical parameters includes displaying a list of gradient compositions if a rate zonal or isopycnic protocol is chosen, whereby the gradient composition of said sample can be selected.

13. The method of claim 10 further including displaying a sedimentation resolution if a rate zonal protocol is chosen, including displaying an iconic representation of a centrifuge tube and displaying first and second marks, said marks demarcating a region on said iconic representation between which said sedimentation resolution will occur.

14. A system for centrifugation of a sample, comprising:

a centrifuge device;

a plurality of rotors;

a plurality of adapters; and a computing sub-system;

said computing sub-system having means for specifying a centrifugation protocol;

said computing sub-system further having means for specifying a rotor from among said plurality of rotors;

said computing sub-system further having means for specifying an adapter from among said plurality of adapters;

said computing sub-system further having means for computing a rotor speed and a run time, said means for computing being responsive to said means for specifying a centrifugation protocol, means for specifying a rotor and means for specifying an adapter;

said computing sub-system further having means for operating said centrifuge device to spin a rotor at a computed rotor speed for a duration of time equal to a computed run time.

15. The system of claim 14 wherein said means for operating said centrifuge device includes data means for communicating said computed rotor speed and said computed run time to said centrifuge device, means for initiating operation of said centrifuge device, means for obtaining a current rotor speed from said centrifuge device and means for displaying said current rotor speed and for displaying an elapsed time of a centrifugation run.

16. The system of claim 14 wherein said centrifuge device includes automated means for ascertaining the type of rotor installed therein and means for communicating an ascertained type of installed rotor to said means for computing, said means for computing further being responsive to said ascertained type of installed rotor.

17. The system of claim 14 wherein said means for specifying a centrifugation protocol includes graphics means for displaying a menu having pelleting, rate zonal and isopycnic menu items.

18. The system of claim 17 wherein said computing sub-system further includes an input device comprising at least one of a mouse, a touch screen, a graphics tablet and a keyboard.

* * * * *